(12) United States Patent
Demers

(10) Patent No.: US 10,898,801 B2
(45) Date of Patent: *Jan. 26, 2021

(54) SELECTING PROPERTIES USING HANDHELD CONTROLLERS

(71) Applicant: Valve Corporation, Bellevue, WA (US)

(72) Inventor: Joe Demers, Seattle, WA (US)

(73) Assignee: Valve Corporation, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/430,255

(22) Filed: Jun. 3, 2019

(65) Prior Publication Data

US 2020/0376376 A1    Dec. 3, 2020

(51) Int. Cl.
| | | |
|---|---|---|
| *A63F 13/40* | (2014.01) |
| *G06F 3/0338* | (2013.01) |
| *G06F 3/0482* | (2013.01) |
| *G06F 3/0484* | (2013.01) |
| *G06F 3/0487* | (2013.01) |
| *A63F 13/42* | (2014.01) |
| *A63F 13/533* | (2014.01) |

(52) U.S. Cl.
CPC ............ *A63F 13/40* (2014.09); *A63F 13/42* (2014.09); *A63F 13/533* (2014.09); *G06F 3/0338* (2013.01); *G06F 3/0482* (2013.01); *G06F 3/0487* (2013.01); *G06F 3/04845* (2013.01); *G06F 3/04847* (2013.01); *A63F 2300/308* (2013.01)

(58) Field of Classification Search
None
See application file for complete search history.

(56) References Cited

U.S. PATENT DOCUMENTS

| | | | | |
|---|---|---|---|---|
| 5,334,992 A | * | 8/1994 | Rochat | G06F 3/04845 345/22 |
| 7,180,524 B1 | * | 2/2007 | Axelrod | G09G 5/02 345/593 |
| 2002/0030700 A1 | * | 3/2002 | Arnold | G06F 3/04842 715/810 |
| 2004/0221243 A1 | * | 11/2004 | Twerdahl | G06F 3/0482 715/834 |
| 2008/0217075 A1 | * | 9/2008 | Gordner | G06F 3/0234 178/18.01 |
| 2009/0160695 A1 | * | 6/2009 | Yokota | G06F 3/04892 341/176 |

(Continued)

OTHER PUBLICATIONS

Non Final Office Action dated Jun. 9, 2020 for U.S. Appl. No. 16/578,112 "Selecting Properties Using Handheld Controllers", Demers, 23 pages.

(Continued)

*Primary Examiner* — Amy M Levy
(74) *Attorney, Agent, or Firm* — Lee & Hayes, P.C.

(57) ABSTRACT

Described herein are, among other things, techniques to enable a user to navigate a color picker or other graphical-user-interface (GUI) tool using an input device of a handheld controller. For example, a user may operate a color picker presented on a display by pressing upwards on a joystick to activate selection of hue, down and to the left to activate selection of saturation, and down and to the right to activate selection of lightness or value.

20 Claims, 12 Drawing Sheets

(56) References Cited

U.S. PATENT DOCUMENTS

| | | | | |
|---|---|---|---|---|
| 2011/0074809 A1* | 3/2011 | Chen | ................. | G06T 19/00 |
| | | | | 345/619 |
| 2011/0105231 A1* | 5/2011 | Ambinder | ............... | A63F 13/24 |
| | | | | 463/38 |
| 2011/0261201 A1* | 10/2011 | Fujii | ................. | B60R 1/00 |
| | | | | 348/148 |
| 2016/0188133 A1* | 6/2016 | Renard | ............... | G06F 3/0488 |
| | | | | 715/771 |
| 2016/0283106 A1* | 9/2016 | Thorne | ............. | H04N 5/23216 |

OTHER PUBLICATIONS

PCT Search Report and Written Opinion dated Jul. 7, 2020 for PCT application No. PCT/US20/35845, 11 pages.

\* cited by examiner

SELECTING PROPERTIES USING HANDHELD CONTROLLERS

BACKGROUND

Handheld controllers are used in an array of architectures for providing input, for example, to a remote computing device. For instance, handheld controllers are utilized in the gaming industry to allow players to interact with a personal computing device executing a gaming application, a game console, a game server, or the like. While current handheld controllers provide a range of functionality, further technical improvements may enhance user experiences that these controllers offer.

BRIEF DESCRIPTION OF THE DRAWINGS

The detailed description is described with reference to the accompanying drawings. In the figures, the left-most digit(s) of a reference number identifies the figure in which the reference number first appears. The use of the same reference numbers in different figures indicates similar or identical components or features.

DETAILED DESCRIPTION

Figure 1:
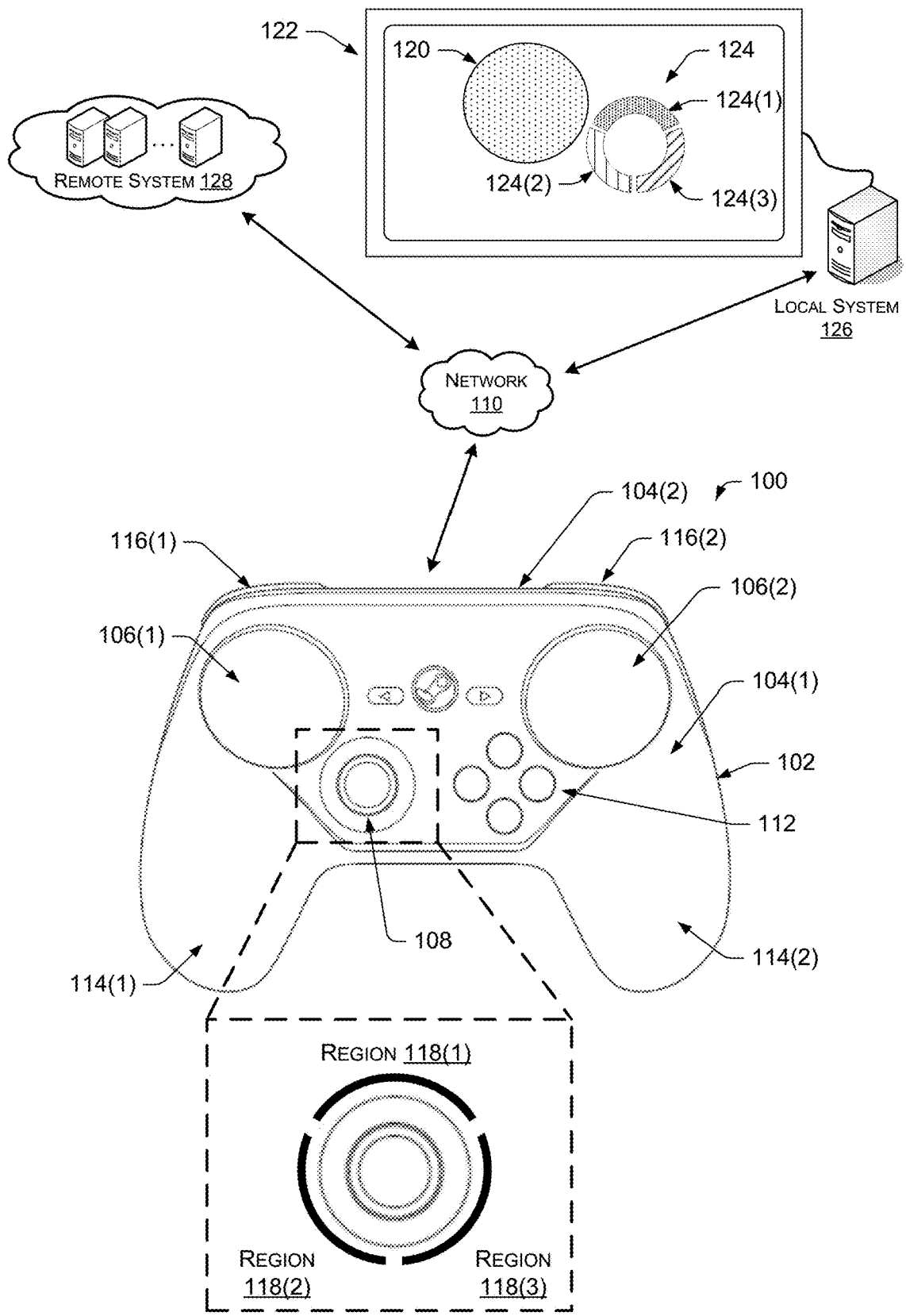
FIG. 1 illustrates an example architecture in which a user may use a handheld controller to interact with virtual objects presented on a display. The handheld controller, a local system, and/or a remote system may include functionality to alter properties, such as hue, saturation, and lightness, of the virtual objects. As illustrated, in some instances a joystick or other input device of the handheld controller may be used to interact with a color picker for selecting hue, saturation, lightness, and/or the like for a displayed virtual object.

As described above, handheld controllers are used in a range of environments and include a range of functionality. For example, handheld controllers may be used in to operate video games, to navigate video content, or to interact with any other application. In some instances, a handheld controller may be used to select values of different properties of virtual objects or other types of content represented on a display. For example, a handheld controller may be used to select a font of a text presented on a display, line spacing of the text, a color of a virtual object, or the like.

Described herein are techniques for enabling a user to operate a handheld controller for selecting values for different properties of content presented on a display. For example, the techniques may enable a user to operate a color picker to select a hue, saturation, and/or brightness of a virtual object presented on a display. In some instances, the user may operate an input device, such as joystick, trackpad, directional pad, or the like, to select which property the user would like to adjust, as well as to select a value of the desired property.

In some examples, an input device of the handheld controller may be operable to provide inputs at different locations on the input device. For instance, a user may operate a joystick to provide an input that begins at a center location and moves towards an outer edge of a range of the joystick. In addition, a user may operate a trackpad by providing an input (e.g., using a finger, stylus, or the like) that is detectable by a touch sensor to indicate movement of the input across the trackpad.

In some instances, different regions of the input devices may be associated with different properties that may be selected and adjusted. For example, envision that a user wishes to operate a color picker, a type of graphical user interface (GUI) tool, to select respective values for three different properties of a color, such as hue, saturation, and lightness/value. Of course, while three example properties are described, it is to be appreciated that any other number and/or type of properties may be adjusted. In any event, a first region of the joystick or trackpad may be associated with the first property, a second region with the second property, and a third region with the third property. For example, in instances where the range-of-motion of the joystick or the shape of the trackpad are circular or elliptical, a first range of outer positions of the joystick or trackpad may be associated with the first property, a second range of outer positions may be associated with the second property, and a third range of outer positions may be associated with the third property.

In this example, the user may operate the joystick or trackpad to select one of the three properties to modify and may thereafter select a value of the property using the joystick or trackpad. For example, a top arc of the joystick may be associated with a first property, such as hue, such that a user may push the joystick generally upwards to select a hue. In response to receiving this selection via a generally upwards push of the joystick, a color picker illustrated on a display may present an indication that the user has selected to modify a hue of a color, rather than the saturation, lightness, value, or the like. After the color picker has highlighted or otherwise indicated that the user has selected to modify a hue, the user may move the joystick around the arc, or around an even larger arc, to change the value of the hue. For example, the illustrated color picker may indicate that the user may move the joystick generally left or right along the outer range of the joystick to select orange, yellow, green, blue, red, and the like. After finding the desired hue, the user may return the joystick from its current position to the center position. For example, the user may simply release the joystick upon selecting the desired hue and the joystick may be biased back to its center position.

After the user has selected the hue, the display may present a virtual object in the selected hue. In addition, the user may then move the joystick generally down and to the left to activate selection of a second property of the color, such as saturation. Upon the user moving the joystick from the center position to an outer position in the second range of outer positions, the color picker presented on the display may be updated to indicate that the user may now select a value of the saturation (or other second property). Thereafter, the user may move the joystick around the arc associated with the second property (or a different arc) to select the desired saturation value. Upon identifying the desired value, the user may return the joystick to the center position, upon which the display may be updated to present the virtual object according to the selected saturation. For example, the user may release the joystick, which may be biased back to its center position.

In addition, the user may then move the joystick from the center position to an outer position within the third range of outer positions associated with the third property, such as lightness or "value". Upon identifying that that the user has moved the joystick in this manner, the display may be updated to indicate that the user may now select a value of the lightness (or any other third property). The users may thereafter move the joystick around the arc associated with lightness (or a different arc) to select the desired lightness value. Upon identifying the desired lightness value, the user may return the joystick to the center position, upon which the display may be updated to present the virtual object according to the selected lightness. For example, the user may release the joystick, which may be biased back to its center position.

In some instances, the user may operate a trackpad to select respective values of different properties, such as hue, saturation, and lightness. For example, a first range of outer positions of the trackpad may be associated with hue or another first property, a second range of outer positions of the trackpad may be associated with saturation or another second property, and a third range of outer positions may be associated with lightness or another third property. Therefore, the user may use her finger, a stylus, or another implement to provide an input (e.g., a touch input) from a center location of the trackpad to a first outer position. In response to determining that the first outer position is associated with selection of the hue or other first property, the display may update the presented color picker to indicate that the user may now alter a value of the hue. The user may move her finger or the implement along the outer positions (e.g., generally clockwise or counterclockwise) to select the desired hue. Upon identifying the desired hue, the user may move her finger or other implement back to the center position or may simply remove the finger or implement from the trackpad. In response, the display be updated to illustrate the virtual object being illustrated by the selected hue.

In addition, the user may use her finger, stylus, or other implement to provide an input from the center position to a second outer position of the second range of second outer positions. In response to determining that the second outer position is associated with selection of the saturation or other second property, the display may update the presented color picker to indicate that the user may now alter a saturation of the color. The user may move her finger or the implement along the outer positions (e.g., generally clockwise or counterclockwise) to select the desired saturation. Upon identifying the desired hue, the user may move her finger or other implement back to the center position or may simply remove the finger or implement from the trackpad. In response, the display be updated to illustrate the virtual object being illustrated by the selected saturation.

In addition, the user may use her finger, stylus, or other implement to provide an input from the center position to a third outer position of the third range of outer positions. In response to determining that the third outer position is associated with selection of the saturation or other first property, the display may update the presented color picker to indicate that the user may now alter a lightness or value of the color. The user may move her finger or the implement along the outer positions (e.g., generally clockwise or counterclockwise) to select the desired lightness for example. Upon identifying the desired lightness, the user may move her finger or other implement back to the center position or may simply remove the finger or implement from the trackpad. In response, the display be updated to illustrate the virtual object being illustrated by the selected lightness.

While the above examples describe using joysticks or trackpads to operate a color picker having multiple properties, it is to be appreciated that the described techniques may apply equally to any other type of input device, such as rollerballs, directional pads, or the like. Further, while the examples described herein are described with reference to altering a color of a virtual object, it is to be appreciated that the techniques may apply equally to selection of any other type of properties, such as font of a text, line spacing, selection of an avatar, or the like.

FIG. 1 illustrates an example architecture in which a user may use a handheld controller 100 to interact with virtual objects presented on a display. While FIG. 1 illustrates one example configuration of a handheld controller 100 that may implement or function with the described techniques, it is to be appreciated that the described techniques apply equally to any other types of handheld controllers having any other type of form factor. In each instance, the respective handheld controller 100, a local system, and/or a remote system may include functionality to alter properties, such as hue, saturation, and lightness, of the virtual objects. As illustrated, in some instances a joystick or other input device of the handheld controller may be used to interact with a color picker for selecting hue, saturation, lightness, and/or the like for a displayed virtual object.

As illustrated, the example handheld controller 100 includes a housing 102 having a front surface 104(1) and a top surface 104(2) potentially along with a back surface opposite the front surface 104(1) and a bottom surface opposite the top surface 104(2). The front surface 104(1) may include one or more front-surface controls that are, in some instances, controllable by one or more thumbs of a user operating the handheld controller 100. These front-surface controls may include one or more trackpads, trackballs, joysticks, buttons, or the like, as described in more detail below. In this example, the front surface 104(1) includes a left trackpad 106(1) controllable by a left thumb of a user and a right trackpad 106(2) controllable by a right thumb of the user. In addition, the example controller 100 includes a joystick 108. The controller may further include depressible buttons 112 (e.g., controllable by a right thumb of the user) and additional input devices and controls. In this example, the handheld controller 100 also includes a left handle 114(1) and a right handle 114(2) by which a user may hold the controller 100 via right and left hands of the user, respectively.

The top surface 104(2), meanwhile, may include one or more top-surface controls. In the illustrated example, the controller 100 includes a left top-surface control 116(1) and a right top-surface control 116(2). The left top-surface control 116(1) may be operable by a left finger (e.g., middle finger or index finger) of the user, while the right top-surface control may be operable by a right finger (e.g., middle finger or index finger) of the user. The top-surface controls 116(1) and 116(2) may be referred to as "triggers" or "bumpers" in some instances. Furthermore, in some instances one or more of the top-surface controls 116(1) and 116(2) may include one or more touch sensors for detecting a presence, location, and/or gesture of one or more fingers of the user on the respective top-surface control.

FIG. 1 further illustrates that different regions of the joystick 108 may be associated with the selection of different properties, such as hue, saturation, and lightness of a virtual object 120 presented on a display 122. For instance, FIG. 1 illustrates that the joystick 108 may be associated with a first region 118(1), generally corresponding atop arc of the joystick, a second region 118(2), generally corresponding to a lower-left arc of the joystick 108, and a third region 118(3), generally corresponding to a lower-right arc of the joystick 108. In addition, each of these regions may be associated with a particular portion of a color pick 124 presented on the display 122.

For example, the region 118(1) may be associated with a first portion 124(1) of the color picker 124, the region 118(2) may be associated with a second portion 124(2) of the color picker 124, and the region 118(3) may be associated with a third portion 124(3) of the color picker 124. In the illustrated example, the first portion 124(1) of the color picker 124 may be selectable to modify a value of a hue of the virtual object 120, the second portion 124(2) of the color picker 124 may be selectable to modify a value of a saturation of the virtual object 120, and the third portion 124(3) of the color picker 124 may be selectable to modify a value of a lightness of the virtual object 120.

Therefore, in order to change an illustrated color of the virtual object 120 presented on the display 120, a user of the handheld controller 100 may, for example, move the joystick 108 upwards into an outer position that is within the first region 118(1). In response, the color picker 124 may enable selection of a hue of the virtual object. In some examples, the presentation of the color picker 124 may be updated to indicate that the user is now able to select a value of hue. For example, the first portion 124(1) may be accentuated (e.g., enlarged, highlighted, etc.) and/or prominence of the remaining two portions 124(2) and 124(3) may be lessened (e.g., removed, shrunk, grayed-out, etc.). Further, after the user has activated the first portion 124(1) of the color picker 124, the user may move the joystick left and right to select a value of the desired hue. In some instances, as the user moves the joystick 108 within the region 118(1) (that is, left or right while pressing the joystick away from the center position), the virtual object 120 may be updated to present the current hue selection. Upon identifying the desired hue, the user may release the joystick, thus causing the joystick to move from its last outer location back to the center position. Thus, the virtual object 120 may change hue from its previous hue to the selected hue (in instances where the hue does not change until the joystick 108 returns to the center position) or may remain in the selected hue (in instances where the display 122 updates as the user moves within the region 118(1)).

In addition, the user of the handheld controller 100 may, for example, move the joystick 108 generally downwards and to the left and into an outer position that is within the second region 118(2). In response, the color picker 124 may enable selection of a saturation of the virtual object. In some examples, the presentation of the color picker 124 may be updated to indicate that the user is now able to select a value of saturation. For example, the second portion 124(2) may be accentuated (e.g., enlarged, highlighted, etc.) and/or prominence of the remaining two portions 124(1) and 124(3) may be lessened (e.g., removed, shrunk, grayed-out, etc.). Further, after the user has activated the second portion 124(2) of the color picker 124, the user may move the joystick within the outer region 118(2) to select a value of the desired saturation. In some instances, as the user moves the joystick 108 within the region 118(2), the virtual object 120 may be updated to present the current saturation selection. Upon identifying the desired saturation, the user may release the joystick, thus causing the joystick to move from its last outer location back to the center position. Thus, the virtual object 120 may change saturation from its previous saturation to the selected saturation (in instances where the saturation does not change until the joystick 108 returns to the center position) or may remain in the selected saturation (in instances where the display 122 updates as the user moves within the region 118(2)).

Furthermore, the user of the handheld controller 100 may, for example, move the joystick 108 generally downwards and to the right and into an outer position that is within the third region 118(3). In response, the color picker 124 may enable selection of a lightness or value of the virtual object. In some examples, the presentation of the color picker 124 may be updated to indicate that the user is now able to select a value of lightness. For example, the third portion 124(3) may be accentuated (e.g., enlarged, highlighted, etc.) and/or prominence of the remaining two portions 124(1) and 124(2) may be lessened (e.g., removed, shrunk, grayed-out, etc.). Further, after the user has activated the third portion 124(3) of the color picker 124, the user may move the joystick within the outer region 118(3) to select a value of the desired lightness. In some instances, as the user moves the joystick 108 within the region 118(3), the virtual object 120 may be updated to present the current lightness selection. Upon identifying the desired lightness, the user may release the joystick, thus causing the joystick to move from its last outer location back to the center position. Thus, the virtual object 120 may change lightness from its previous lightness to the selected lightness (in instances where the lightness does not change until the joystick 108 returns to the center position) or may remain in the selected lightness (in instances where the display 122 updates as the user moves within the region 118(1).

It is to be appreciated that while FIG. 1 illustrates an example configuration of using an input device to alter properties of content on a display 122, other configurations are possible. For example, the number, orientation and other characteristics of the regions 118(1)-(3) may be the same or different than illustrated. Further, the properties are hue, saturation, and lightness are merely illustrative, and other properties may be altered using the described techniques. Further, input devices other than the joystick may be used with the described techniques, such as a trackpad 106(1) as illustrated and described below with reference to FIGS. 3A-C.

In addition, FIG. 1 illustrates that the handheld controller 100 may communicate with a local system 126 and/or a remote system 128 over one or more wired and/or wireless networks 110. The local and/or remote systems may, in some instances, provide content for presentation on the display, such as the illustrated virtual object 120. Further, the functionality for launching the color picker 124 and altering corresponding properties may be performed at the handheld controller 100, the local system 126, the remote system 128, or a combination thereof. That is, one or more of the controller and/or the local or remote systems may perform the operations described below.

Figure 2A:
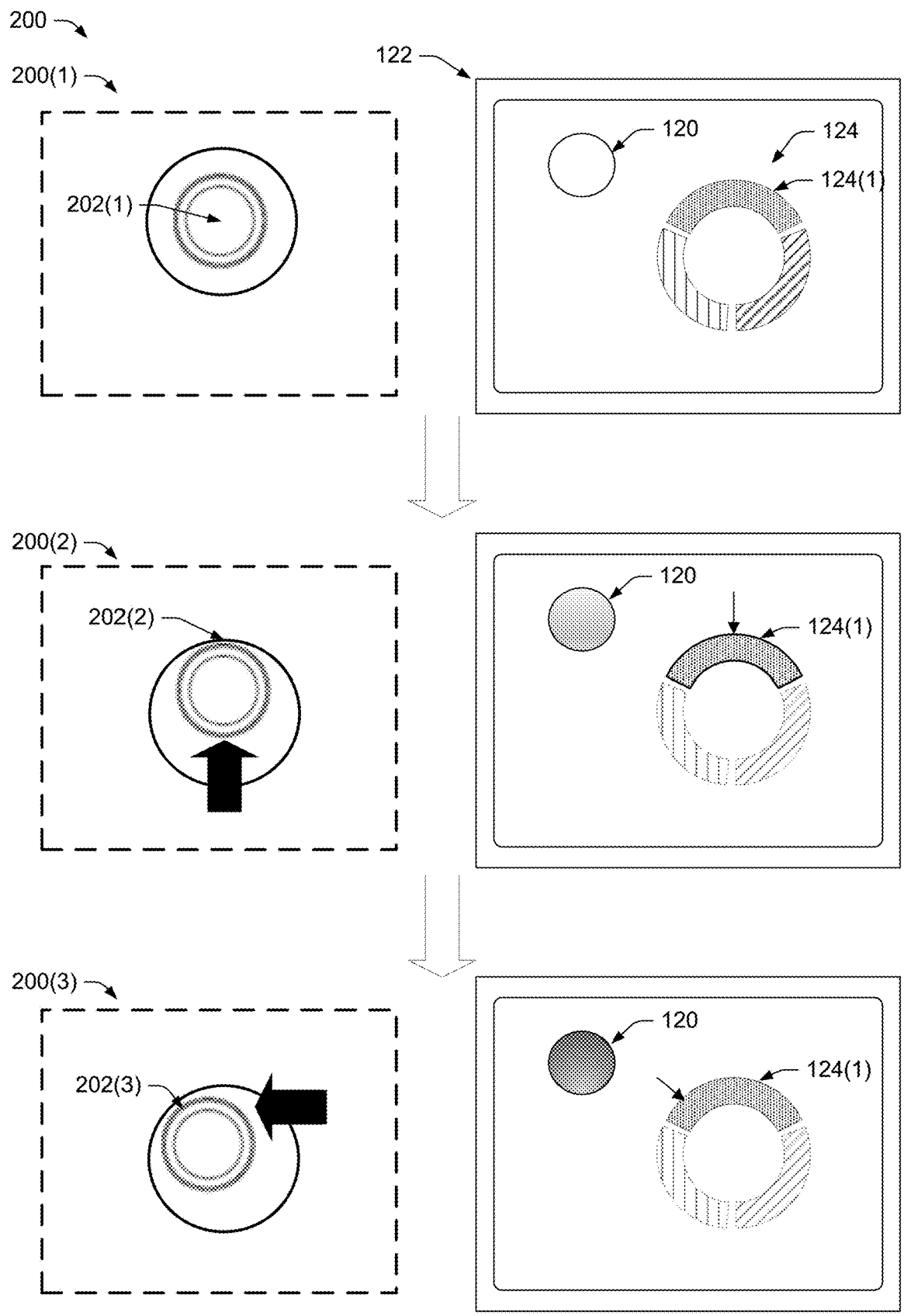
FIG. 2A illustrates an example flow of operations where a user moves a joystick of a handheld controller from a center position to a first defined outer region to enable selection of a first property, such as hue of a virtual object. After the joystick moves to this region, the user may use the joystick to select a hue or other property using a color picker presented on a display.

FIG. 2A illustrates an example flow of operations 200 where a user moves a joystick of a handheld controller from a center position 202(1) to a first defined outer region to enable selection of a first property, such as hue of a virtual object. After the joystick moves to this region, the user may use the joystick to select a hue or other property using a color picker presented on a display.

As illustrated at 200(1), a display 122 may present a virtual object 120 and a color picker 124 to enable a user to modify a color of the object 120. The user may issue a request to launch the color picker 124 using the handheld controller or in any other manner. As illustrated at 200(1), the joystick may initially reside in the center position 202(1).

At 200(2), the user may bias the joystick generally upwards and into an outer position 202(2) that is within a region of outer positions that is associated with altering hue of the virtual object. In response to the joystick being moved into this region, the color picker 124 may indicate that the first portion 124(1) of the color picker 124 for selecting a hue has been activated. In addition, the hue of the virtual object 120 may be updated to indicate the current hue corresponding to the location of the joystick.

At 200(3), the user moves the joystick to the left to another outer position 202(3), thus changing the value of the hue. As illustrated, the first portion 124(1) of the color picker 124 may be updated to reflect the new selection. In addition, or in the alternative, the hue of the virtual object 120 may be updated to reflect the selected hue. Upon identifying the desired hue, the user may release the joystick, thus causing the joystick to bias back to the center position 202(1). At this point, the first portion 124(1) of the color picker 124 might no longer be activated for selecting a hue of the virtual object 120.

Figure 2B:
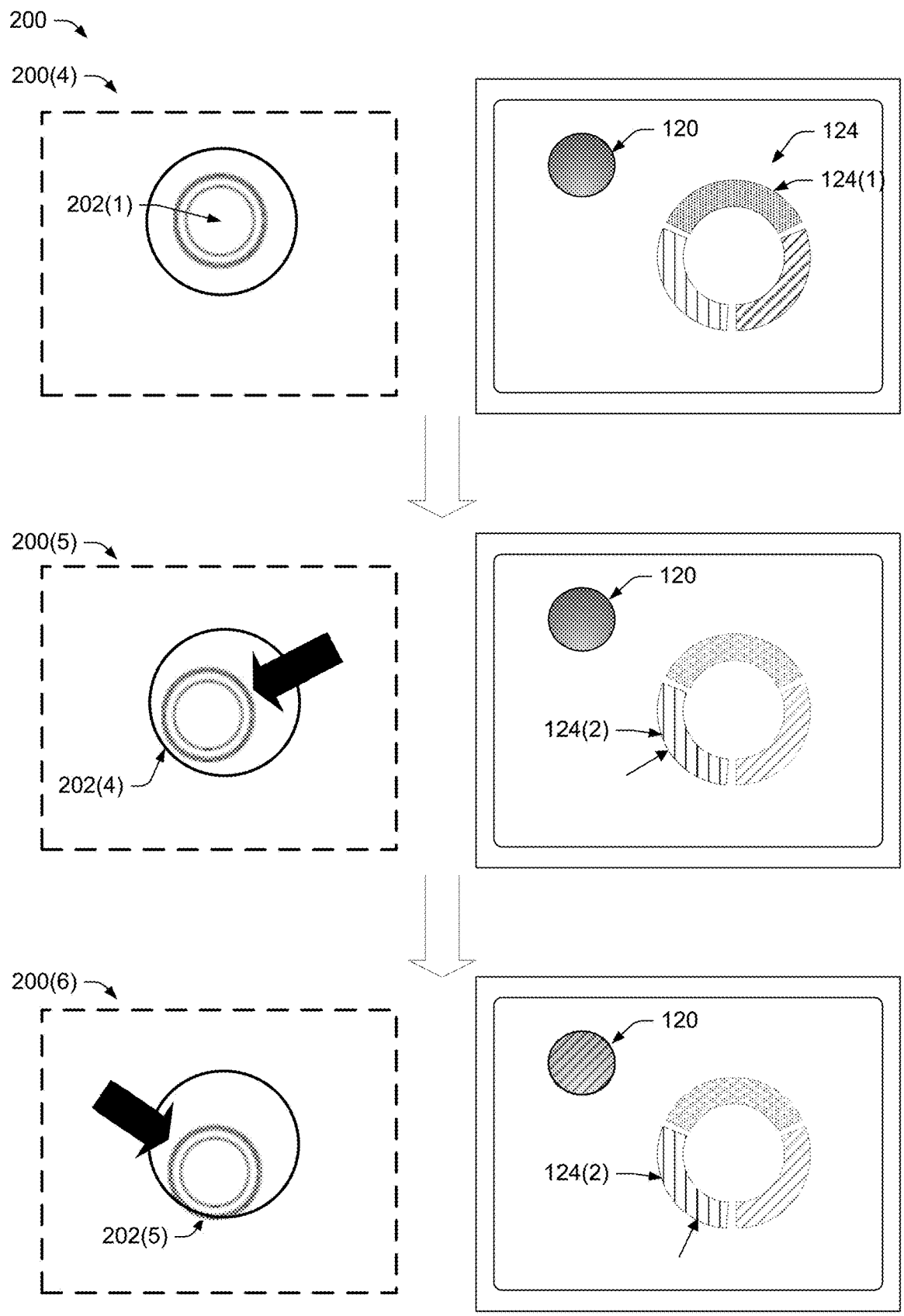
FIG. 2B illustrates an example flow of operations where the user moves the joystick from the center position to a second defined outer region to enable selection of a second property, such as saturation of a virtual object. After the joystick moves to this region, the user may use the joystick to select the saturation or other property using the presented color picker.

FIG. 2B continues the flow of operations 200 where the user moves the joystick from the center position 202(1) to a second defined outer region to enable selection of a second property, such as saturation of a virtual object. After the joystick moves to this region, the user may use the joystick to select the saturation or other property using the presented color picker.

As illustrated at 200(4), the display 122 may present the virtual object 120 according to the hue selected in FIG. 2A and may also display the color picker 124. At 200(4), the joystick may reside in the center position 202(1).

At 200(5), the user may bias the joystick generally downwards and left and into an outer position 202(4) that is within a region of outer positions that is associated with altering saturation of the virtual object. In response to the joystick being moved into this region, the color picker 124 may indicate that the second portion 124(2) of the color picker 124 for selecting a saturation has been activated. In addition, the saturation of the virtual object 120 may be updated to indicate the current saturation corresponding to the location of the joystick.

At 200(6), the user moves the joystick down and to the right to another outer position 202(5), thus changing the value of the saturation. As illustrated, the second portion 124(2) of the color picker 124 may be updated to reflect the new selection. In addition, or in the alternative, the saturation of the virtual object 120 may be updated to reflect the selected saturation. Upon identifying the desired saturation, the user may release the joystick, thus causing the joystick to bias back to the center position 202(1). At this point, the second portion 124(2) of the color picker 124 might no longer be activated for selecting a saturation of the virtual object 120.

Figure 2C:
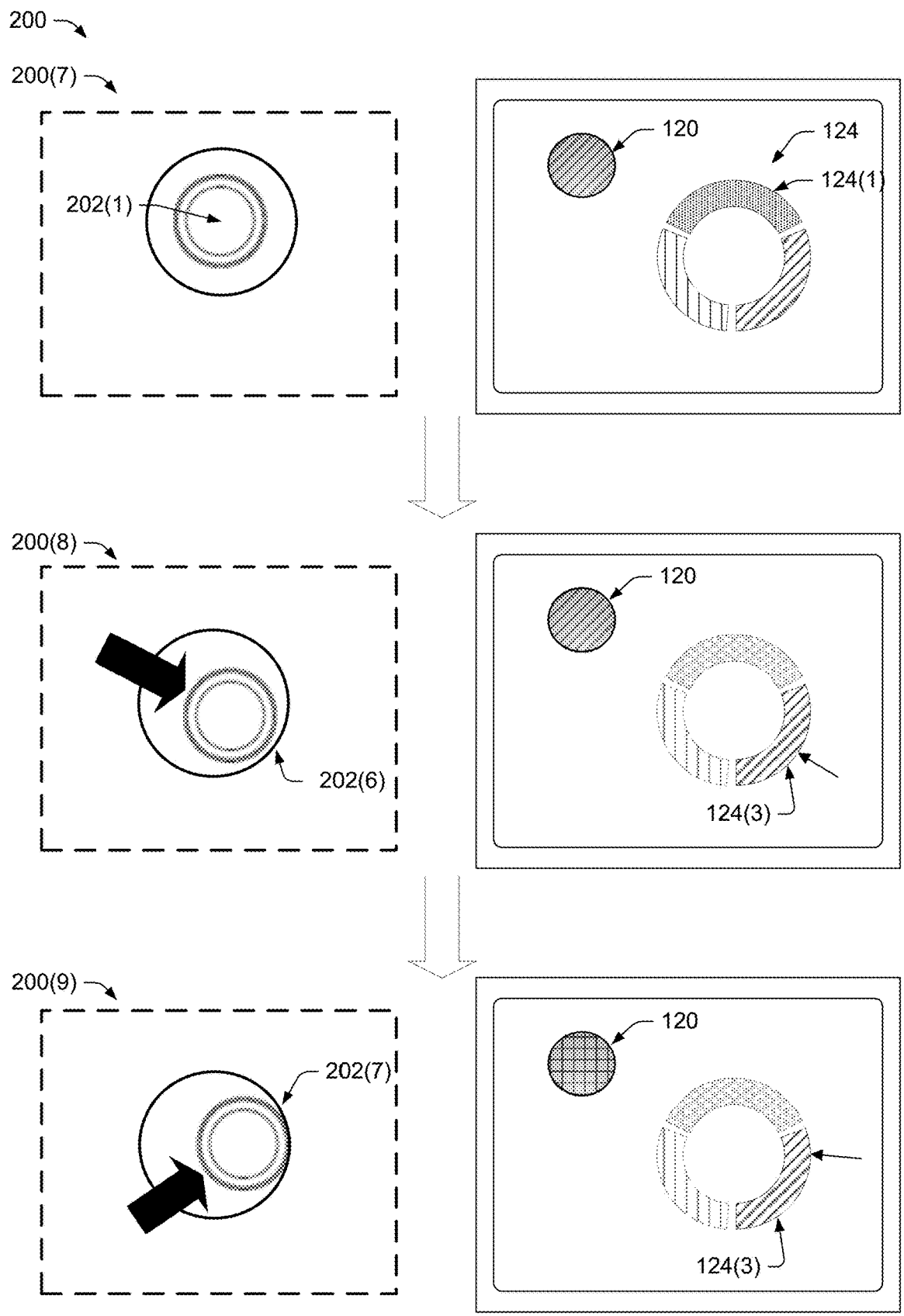
FIG. 2C illustrates an example flow of operations where the user moves the joystick from the center position to a third defined outer region to enable selection of a third property, such as lightness or "value" of a virtual object. After the joystick moves to this region, the user may use the joystick to select the lightness or other property using the presented color picker.

FIG. 2C continues the flow of operations 200 where the user moves the joystick from the center position to a third defined outer region to enable selection of a third property, such as lightness or "value" of a virtual object. After the joystick moves to this region, the user may use the joystick to select the lightness or other property using the presented color picker.

As illustrated at 200(7), the display 122 may present the virtual object 120 according to the hue and saturation selected in FIGS. 2A and 2B, respectively, and may also display the color picker 124. At 200(7), the joystick may reside in the center position 202(1).

At 200(8), the user may bias the joystick generally downwards and right and into an outer position 202(6) that is within a region of outer positions that is associated with altering lightness of the virtual object. In response to the joystick being moved into this region, the color picker 124 may indicate that the third portion 124(3) of the color picker 124 for selecting a lightness has been activated. In addition, the lightness of the virtual object 120 may be updated to indicate the current lightness corresponding to the location of the joystick.

At 200(9), the user moves the joystick up and to the right to another outer position 202(7), thus changing the value of the lightness. As illustrated, the third portion 124(3) of the color picker 124 may be updated to reflect the new selection. In addition, or in the alternative, the lightness of the virtual object 120 may be updated to reflect the selected lightness. Upon identifying the desired lightness, the user may release the joystick, thus causing the joystick to bias back to the center position 202(1). At this point, the third portion 124(3) of the color picker 124 might no longer be activated for selecting a lightness of the virtual object 120.

Figure 3A:
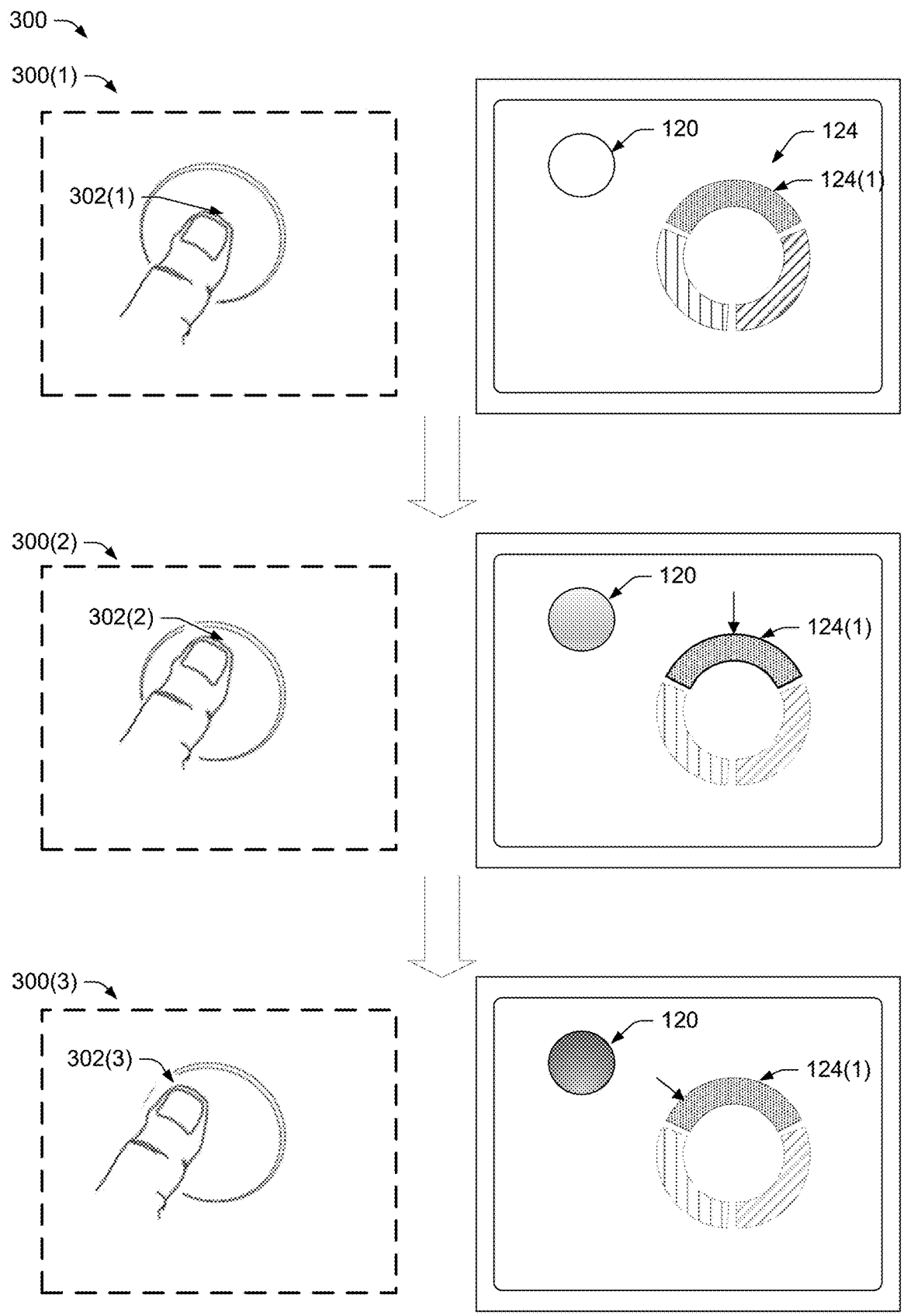
FIG. 3A illustrates an example flow of operations where the user provides an input to an input device of a handheld controller (in this example, a trackpad) at a first defined outer region to enable selection of a first property, such as hue of a virtual object. After this input is received, the user may use trackpad or other input device to select the hue or other property using the presented color picker.

FIG. 3A illustrates an example flow of operations where the user provides an input to an input device of a handheld controller (in this example, a trackpad) a first defined outer region to enable selection of a first property, such as hue of a virtual object. After this input is received, the user may use trackpad or other input device to select the hue or other property using the presented color picker. It is to be appreciated that this while this example describes the input starting at a center position and moving towards the first defined outer region, in some instances the input may simply be received at the first outer region for enabling selection of the first property or may begin at any other portion of the trackpad before moving to the first outer region.

As illustrated at 300(1), the display 122 again presents the virtual object 120 and the color picker 124 to enable a user to modify a color of the object 120. The user may issue a request to launch the color picker 124 using the handheld controller or in any other manner. As illustrated at 300(1), an implement (e.g., a finger, stylus, etc.) may initially reside in or otherwise correspond to (e.g., hover over) the center position 302(1).

At 300(2), the user may provide a touch input (e.g., via a finger, stylus, etc.) that is upwards from the center position and into an outer position 302(2) that is within a region of outer positions that is associated with altering hue of the virtual object. In response to this input into this region, the color picker 124 may indicate that the first portion 124(1) of the color picker 124 for selecting a hue has been activated. In addition, the hue of the virtual object 120 may be updated to indicate the current hue corresponding to the current location of the touch input.

At 300(3), the user provides an input to the left to another outer position 302(3), thus changing the value of the hue. As illustrated, the first portion 124(1) of the color picker 124 may be updated to reflect the new selection. In addition, or in the alternative, the hue of the virtual object 120 may be updated to reflect the selected hue. Upon identifying the desired hue, the user may provide an input towards the center position 302(1) or may simply remove the touch input (e.g., lift her finger from the trackpad). At this point, the first portion 124(1) of the color picker 124 might no longer be activated for selecting a hue of the virtual object 120.

Figure 3B:
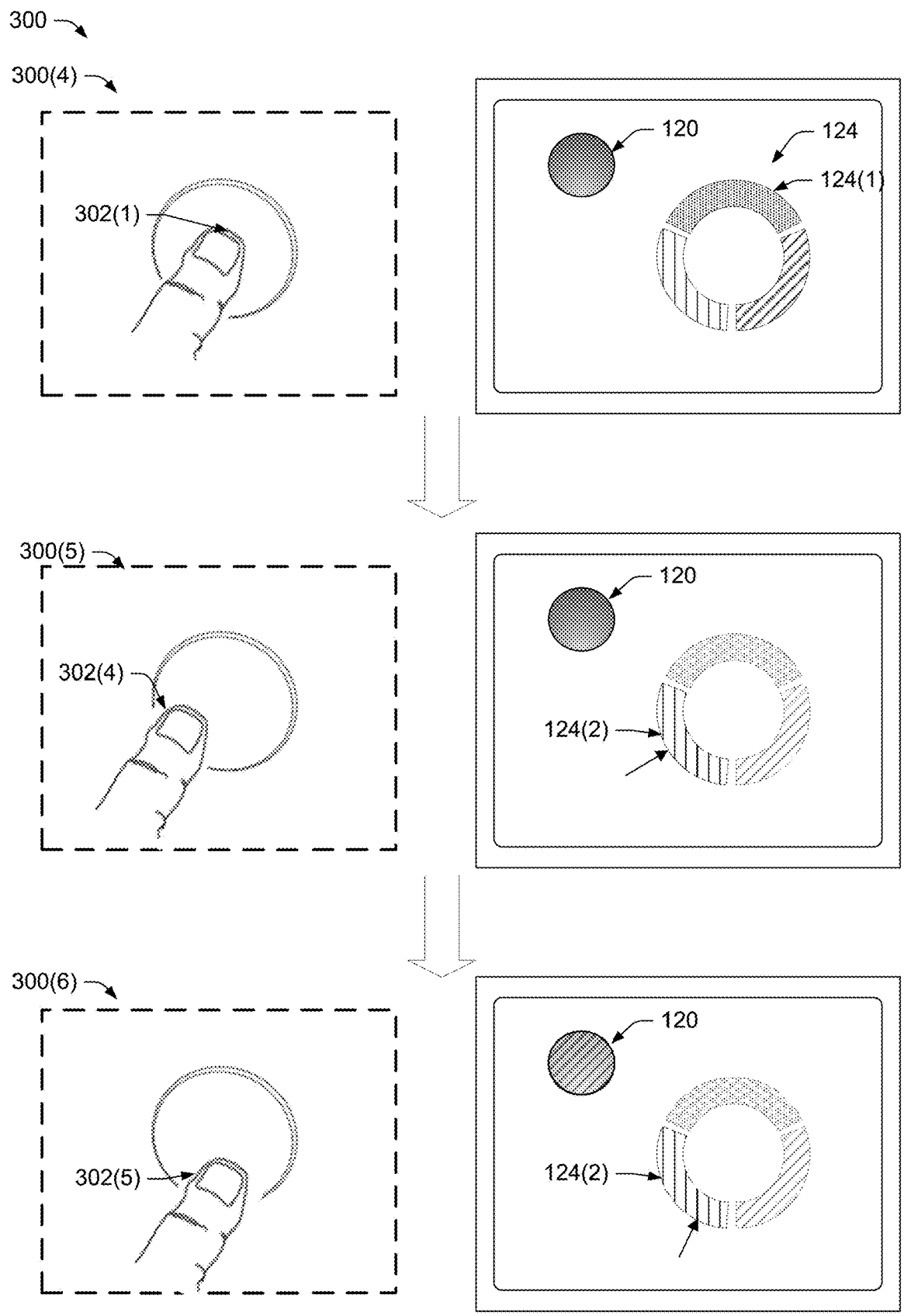
FIG. 3B illustrates an example flow of operations where the user provides an input to the trackpad at a second defined outer region to enable selection of a second property, such as saturation of a virtual object. After this input is received, the user may use trackpad or other input device to select the saturation or other property using the presented color picker.

FIG. 3B continues the flow of operations 300 where the user provides an input to the trackpad at a second defined outer region to enable selection of a second property, such as saturation of a virtual object. After this input is received, the user may use trackpad or other input device to select the saturation or other property using the presented color picker. Again, it is to be appreciated that this while this example describes the input starting at a center position and moving towards the second defined outer region, in some instances the input may simply be received at the second outer region for enabling selection of the first property or may begin at any other portion of the trackpad before moving to the second outer region.

As illustrated at 300(4), the display 122 may present the virtual object 120 according to the hue selected in FIG. 3A and may also display the color picker 124. At 300(4), the implement (e.g., a finger, stylus, etc.) may reside in or otherwise correspond to (e.g., hover over) the center position 302(1).

At 300(5), the user may provide a touch input generally downwards and left and into an outer position 302(4) that is within a region of outer positions that is associated with altering saturation of the virtual object. In response to the touch input into this region, the color picker 124 may indicate that the second portion 124(2) of the color picker 124 for selecting a saturation has been activated. In addition, the saturation of the virtual object 120 may be updated to indicate the current saturation corresponding to the current location of the touch input.

At 300(6), the user provides a touch input down and to the right to another outer position 302(5), thus changing the value of the saturation. As illustrated, the second portion 124(2) of the color picker 124 may be updated to reflect the new selection. In addition, or in the alternative, the saturation of the virtual object 120 may be updated to reflect the selected saturation. Upon identifying the desired saturation, the user may provide a touch input towards the center position 302(1) or may remove the implement from the trackpad. At this point, the second portion 124(2) of the color picker 124 might no longer be activated for selecting a saturation of the virtual object 120.

Figure 3C:
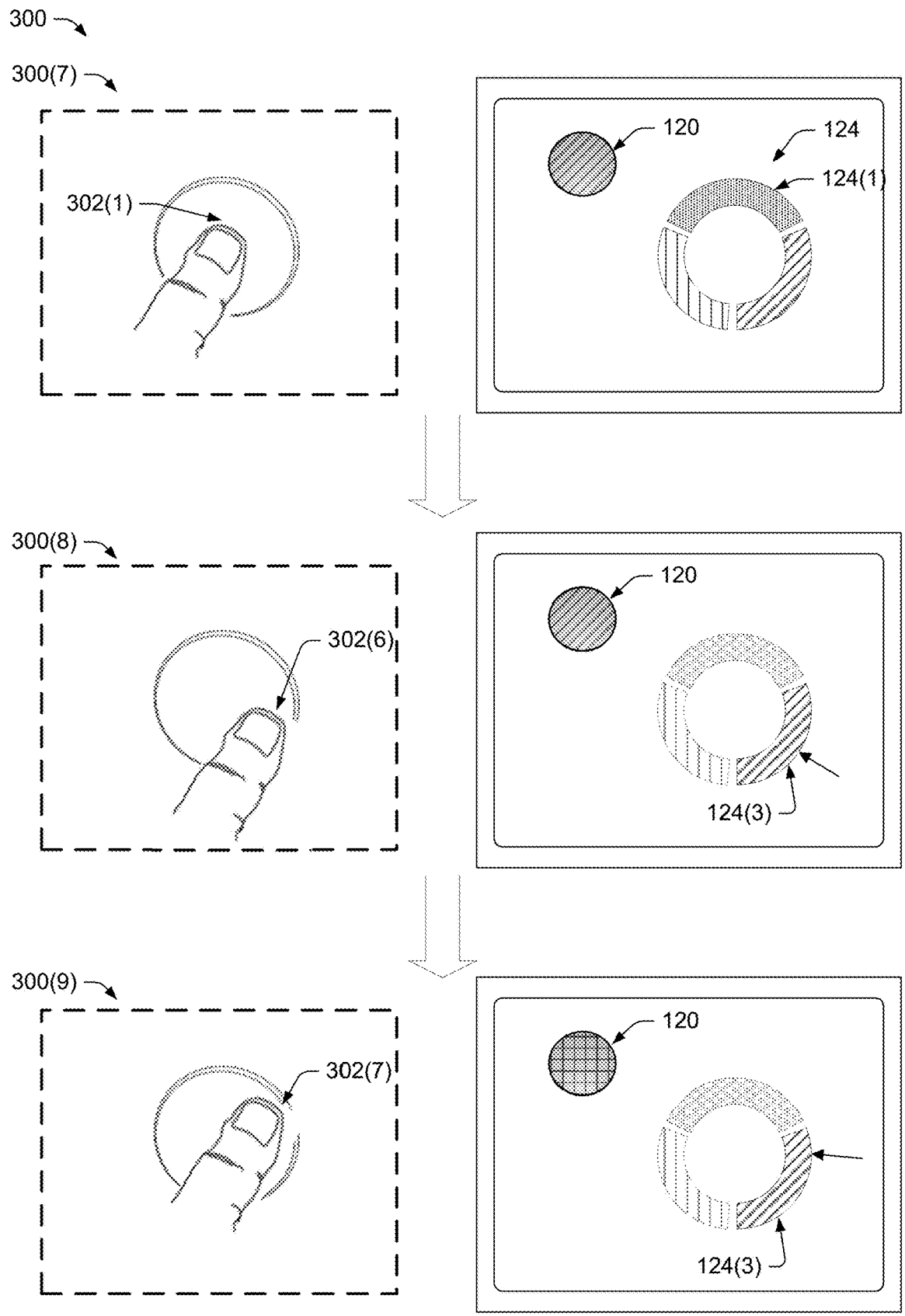
FIG. 3C illustrates an example flow of operations where the user provides an input to the trackpad at third defined outer region to enable selection of a third property, such as lightness of a virtual object. After this input is received, the user may use trackpad or other input device to select the lightness or other property using the presented color picker.

FIG. 3C continues the flow of operations 300 where the user provides an input to the trackpad at a third defined outer region to enable selection of a third property, such as lightness of a virtual object. After this input is received, the user may use trackpad or other input device to select the lightness or other property using the presented color picker. Again, it is to be appreciated that this while this example describes the input starting at a center position and moving towards the third defined outer region, in some instances the input may simply be received at the third outer region for enabling selection of the first property or may begin at any other portion of the trackpad before moving to the third outer region.

As illustrated at 300(7), the display 122 may present the virtual object 120 according to the hue and saturation selected in FIGS. 3A and 3B, respectively, and may also display the color picker 124. At 300(7), the implement may reside in or otherwise correspond to (e.g., hover over) the center position 302(1).

At 300(8), the user may provide a touch input generally downwards and right and into an outer position 302(6) that is within a region of outer positions that is associated with altering lightness of the virtual object. In response to the input into this region, the color picker 124 may indicate that the third portion 124(3) of the color picker 124 for selecting a lightness has been activated. In addition, the lightness of the virtual object 120 may be updated to indicate the current lightness corresponding to the location of the touch input.

At 300(9), the user moves the joystick up and to the right to another outer position 302(7), thus changing the value of the lightness. As illustrated, the third portion 124(3) of the color picker 124 may be updated to reflect the new selection. In addition, or in the alternative, the lightness of the virtual object 120 may be updated to reflect the selected lightness. Upon identifying the desired lightness, the user may provide a touch input towards the center position 302(1) or may remove the implement from the trackpad. At this point, the third portion 124(3) of the color picker 124 might no longer be activated for selecting a lightness of the virtual object 120.

Figure 4:
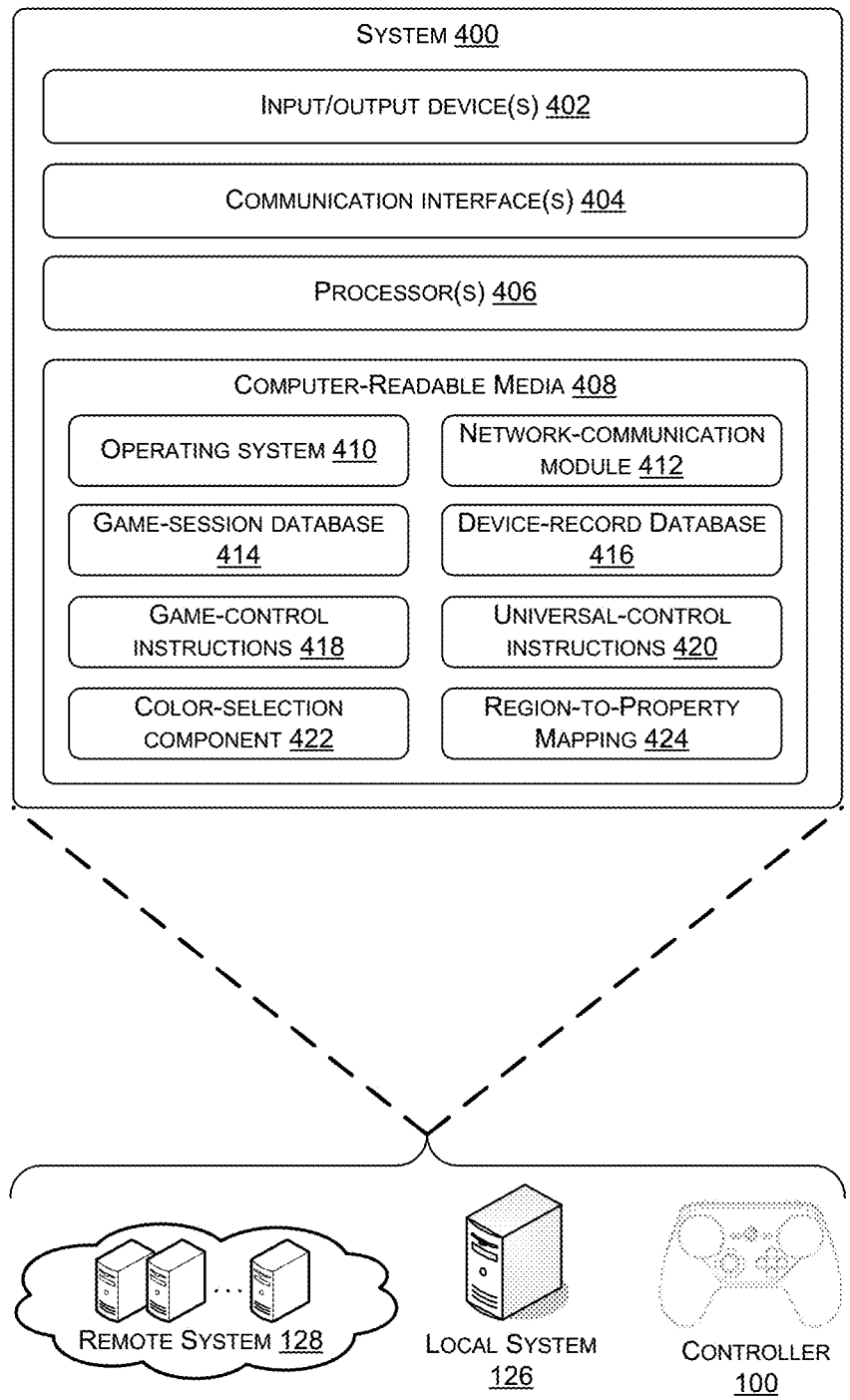
FIG. 4 illustrates example components of a system for performing the operations described herein. In some instances, these components may reside on the handheld controller, the local system, the remote system, and/or a combination thereof.

FIG. 4 illustrates example components of a system 400 for performing the operations described herein. In some instances, these components may reside on the handheld controller, the local system, the remote system, and/or a combination thereof.

As illustrated, one or more of the described systems (e.g., controller, local system, remote system, etc.) may include one or more input/output (I/O) devices 402, such as the controls described above (e.g., joysticks, trackpads, triggers, detachable controls, fixed controls, etc.), and potentially any other type of input or output devices. For example, the I/O devices 402 may include one or more microphones to receive audio input, such as user voice input. In some embodiments, additional input devices may be provided in the form of a keyboard, keypad, mouse, touch screen, joystick, control buttons and the like. The input device(s) may further include control mechanisms, such as basic volume control button(s) for increasing/decreasing volume, as well as power and reset buttons.

The output devices, meanwhile, may include a display, a light element (e.g., LED), a vibrator to create haptic sensations, a speaker(s) (e.g., headphones), and/or the like. There may also be a simple light element (e.g., LED) to indicate a state such as, for example, when power is on. While a few examples have been provided, the system 400 may additionally or alternatively comprise any other type of output device.

In addition, the system 400 may include one or more communication interfaces 404 to facilitate a wireless connection to a network and/or to one or more remote systems (e.g., a host computing device executing an application, a game console, etc.). The communication interfaces 404 may implement one or more of various wireless technologies, such as Wi-Fi, Bluetooth, radio frequency (RF), and so on. It is to be appreciated that the system 400 may further include physical ports to facilitate a wired connection to a network, a connected peripheral device, or a plug-in network device that communicates with other wireless networks.

In the illustrated implementation, the system 400 further includes one or more processors 406 and computer-readable media 408. In some implementations, the processors(s) 406 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 406 may possess its own local memory, which also may store program modules, program data, and/or one or more operating systems.

The computer-readable media 408 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 408 may be implemented as computer-readable storage media ("CRSM"), which may be any available physical media accessible by the processor(s) 406 to execute instructions stored on the computer-readable media 408. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 406.

Several modules such as instruction, datastores, and so forth may be stored within the computer-readable media 408 and configured to execute on the processor(s) 406. A few example functional modules are shown as stored in the computer-readable media 408 and executed on the processor(s) 406, although the same functionality may alternatively be implemented in hardware, firmware, or as a system on a chip (SOC).

An operating system module 410 may be configured to manage hardware within and coupled to the system 400 for the benefit of other modules. In addition, the computer-readable media 408 may store a network-communications module 412 that enables the system 400 to communicate, via the communication interfaces 404, with one or more other devices, such as a personal computing device executing an application (e.g., a game application), a game console, a remote server, or the like. The computer-readable media 408 may further include a game-session database 414 to store data associated with a game (or other application) executing on the system 400 or on a computing device to which the system 400 couples. The computer-readable media 408 may also include a device-record database 416 that stores data associated with devices to which the system 400 couples, such as the personal computing device, game console, remote server or the like. The computer-readable media 408 may further store game-control instructions 418 that configure the system 400 to function as a gaming controller and universal-control instructions 420 that configure the system 400 to function as a controller of other, non-gaming devices (in instances where the system 400 comprises a controller).

In addition, the computer-readable media 408 may store a color-selection component 422 and a region-to-property mapping 424 that may function to enable the property-selection techniques described above. For instance, the color-selection component 422 may function to launch the color picker 124 described above upon receiving an instruction to do so. In addition, the color-selection component 422 may receive inputs from a handheld controller to determine which property is to be altered at a given time and the value to which the property is to be altered. For example, upon receiving an indication that an input (e.g., via an input device of a handheld controller) has been received corresponding a particular outer position of the input device while the color picker is in operation, the color-selection component 422 may access the region-to-property mapping 424 to determine which property is to be modified. In addition, the color-selection component 422 may access the mapping 424 upon receiving inputs to determine the value of the property to be modified. It is to be appreciated that the color-selection component 422 and/or the region-to-property mapping may reside on the local system 126 (e.g., a computing device that directly couples to the display 122), the remote system 128 (e.g., server computing devices that couple to the display 122 and/or local system 126 over a network), a handheld controller 100 (e.g., that couples to the local and/or remote systems), and/or a combination thereof.

Figure 5A:
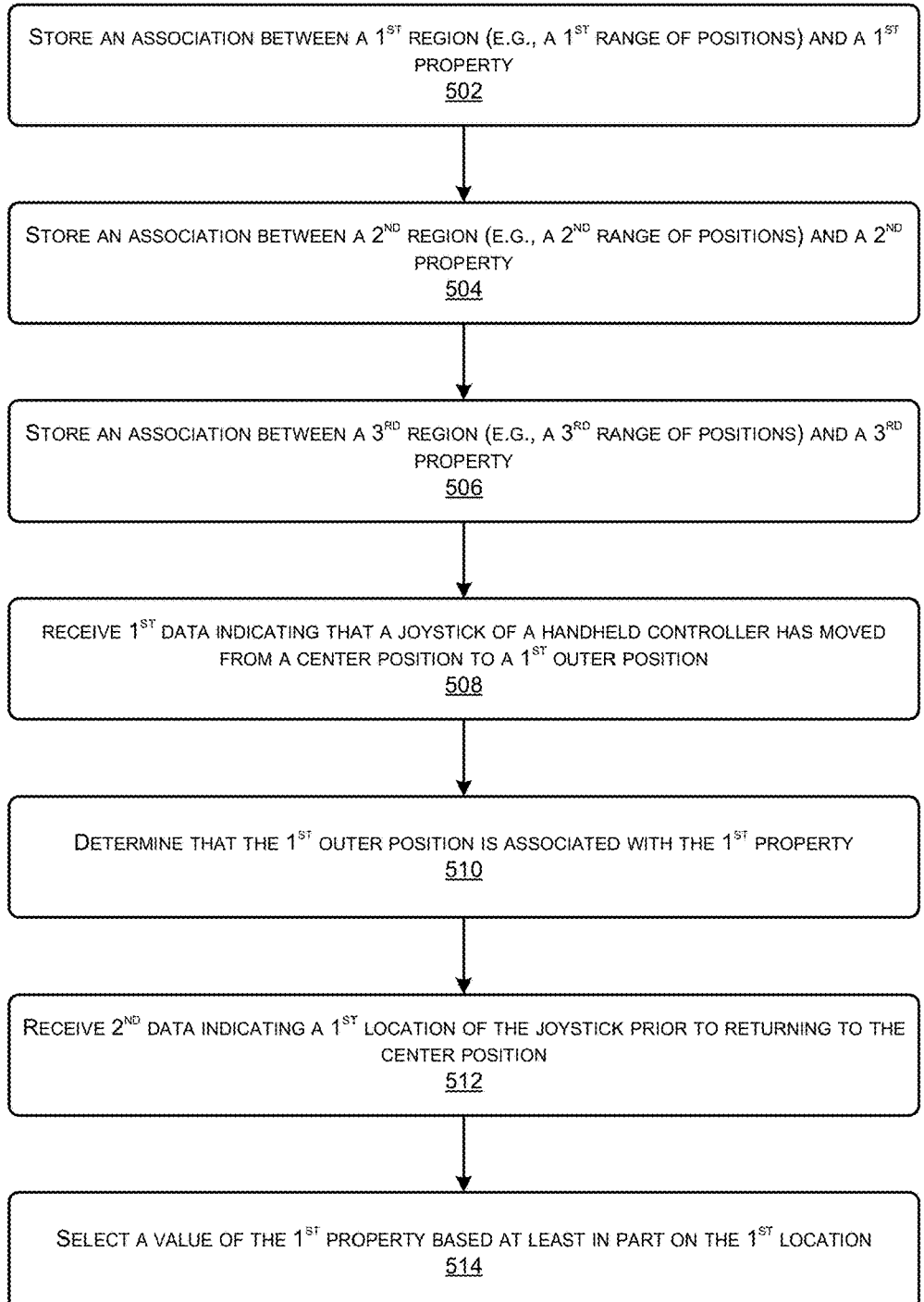
FIGS. 5A-5C collectively illustrate a flow diagram of an example process for using a joystick on a handheld controller to operate a color picker for modifying presentation of a virtual object on a display.
Figure 5B:
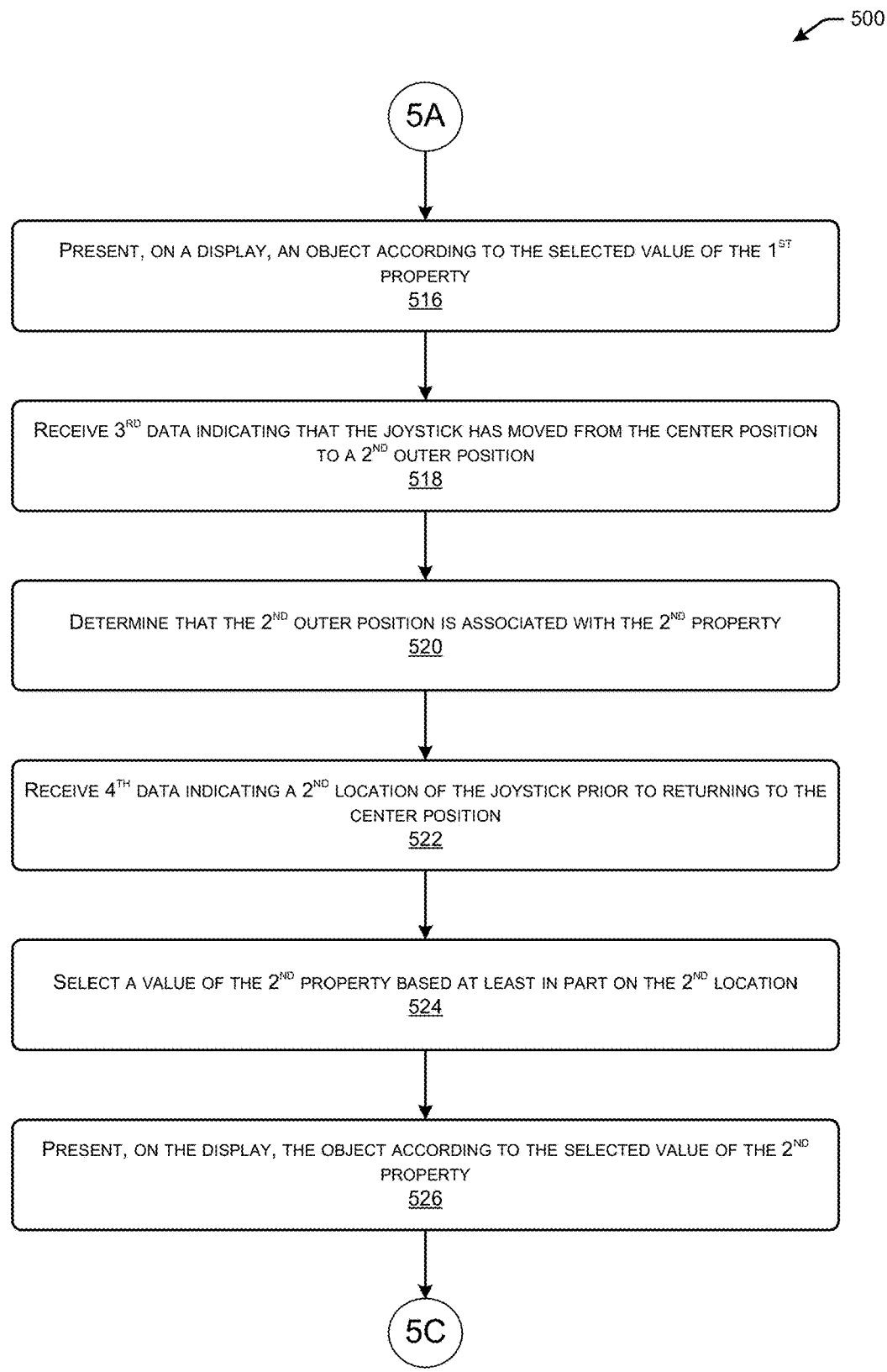
Figure 5C:
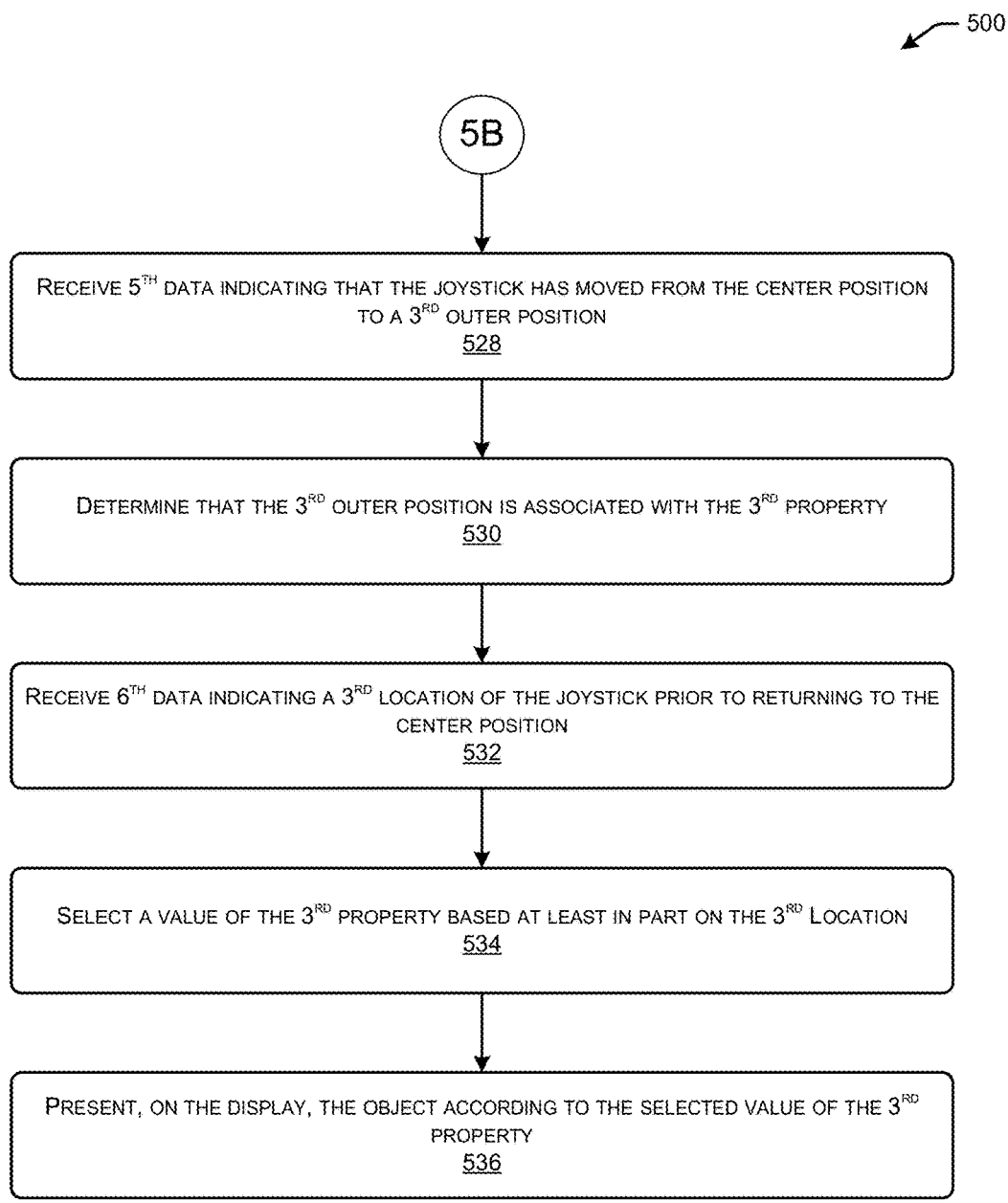

FIGS. 5A-5C collectively illustrate a flow diagram of an example process 500 for using a joystick on a handheld controller to operate a color picker for modifying presentation of a virtual object on a display. The process 500, as well as other processes described herein, is described as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. Further, the operations may be performed by the handheld controller 100, the local system 126, the remote system 128, and/or any other system or combination of systems.

An operation 502 represents storing an association between a first region (e.g., a first range of outer positions) and a first property for which a value may be selected (e.g., a hue). For example, this operation may represent storing, in the property-to-region mapping 424, an indication of which X-Y positions of the joystick correspond to the first property, such as hue. Similarly, an operation 504 represents storing an association between a second region (e.g., a second range of outer positions) and a second property for which a value may be selected (e.g., a saturation). For example, this operation may represent storing, in the property-to-region mapping 424, an indication of which X-Y positions of the joystick correspond to the second property, such as saturation. An operation 506 represents storing an association between a third region (e.g., a third range of outer positions) and a third property for which a value may be selected (e.g., a lightness). For example, this operation may represent storing, in the property-to-region mapping 424, an indication of which X-Y positions of the joystick correspond to the third property, such as lightness.

An operation 508, meanwhile, represents receiving first data indicating that a joystick of a handheld controller has moved from a center position to a first outer position. The first outer position may be represented in X-Y coordinates or otherwise. An operation 510 represents determining that the first outer position is associated with a first property. For example, the color-selection component 424 may compare the X-Y coordinates of the first outer position to the regions referenced in the region-to-property mapping 424 to determine that the first outer position corresponds to the first property.

An operation 512 represents receiving second data indicating a first location of the joystick prior to returning to the center position, while an operation 514 represents selecting a value of the first property based at least in part on the first location. That is, the color-selection component 422 may receive an indication of a final location of the joystick prior to release of the joystick and return to the center position. The color-selection component 422 may access the mapping 424 and may determine, from the final-location value, the selected value of the first property, such as a value of a hue. It is to be appreciated that the color-selection component 422 may select (e.g., change) values of the property as the joystick is moved, after moving from the outer position and prior to returning to the center position.

FIG. 5B continues the illustration of the process 500 and includes, at an operation 516, presenting, on a display, an object according to the selected value of the first property. For example, the color-selection component 422 may cause display of an object according to the selected hue. In instances where the value of the property is selected as the joystick is moved (after moving from the outer position and prior to returning to the center position), the process 500 may present the object having the selected values as the joystick moves around. For example, as the user moves the joystick from a red value to a green value, the process 500 may present the object in an array of different colors corresponding to the current location of the joystick. The final-selection value, meanwhile, may correspond to the final location of the joystick prior to returning to the center position.

An operation 518 represents receiving third data indicating that a joystick of a handheld controller has moved from the center position to a second outer position. The second outer position may be represented in X-Y coordinates or otherwise. An operation 520 represents determining that the second outer position is associated with a second property. For example, the color-selection component 424 may compare the X-Y coordinates of the second outer position to the regions referenced in the region-to-property mapping 424 to determine that the second outer position corresponds to the second property.

An operation 522 represents receiving fourth data indicating a second location of the joystick prior to returning to the center position, while an operation 524 represents selecting a value of the second property based at least in part on the second location. That is, the color-selection component 422 may receive an indication of a final location of the joystick prior to release of the joystick and return to the center position. The color-selection component 422 may access the mapping 424 and may determine, from the final-location value, the selected value of the second property, such as a value of a saturation. It is to be appreciated that the color-selection component 422 may select (e.g., change) values of the property as the joystick is moved, after moving from the outer position and prior to returning to the center position. An operation 526 represents presenting, on a display, an object according to the selected value of the second property. For example, the color-selection component 422 may cause display of an object according to the selected saturation. In instances where the value of the property is selected as the joystick is moved (after moving from the outer position and prior to returning to the center position), the process 500 may present the object having the selected values as the joystick moves around. For example, as the user moves the joystick from a first saturation value to a second saturation value, the process 500 may present the object according to an array of different saturation values corresponding to the current location of the joystick. The final-selection value, meanwhile, may correspond to the final location of the joystick prior to returning to the center position.

FIG. 5C concludes the illustration of the process 500 and includes, at an operation 528, receiving fifth data indicating that a joystick of a handheld controller has moved from the center position to a third outer position. The third outer position may be represented in X-Y coordinates or otherwise. An operation 530 represents determining that the third outer position is associated with a third property. For example, the color-selection component 424 may compare the X-Y coordinates of the third outer position to the regions referenced in the region-to-property mapping 424 to determine that the third outer position corresponds to the third property.

An operation 532 represents receiving sixth data indicating a third location of the joystick prior to returning to the center position, while an operation 534 represents selecting a value of the third property based at least in part on the third location. That is, the color-selection component 422 may receive an indication of a final location of the joystick prior to release of the joystick and return to the center position. The color-selection component 422 may access the mapping 424 and may determine, from the final-location value, the selected value of the third property, such as a value of a lightness. An operation 536 represents presenting, on a display, an object according to the selected value of the second property. For example, the color-selection component 422 may cause display of an object according to the selected lightness. Again, it is to be appreciated that the color-selection component 422 may select (e.g., change) values of the property as the joystick is moved, after moving from the outer position and prior to returning to the center position. Further, in instances where the value of the property is selected as the joystick is moved (after moving from the outer position and prior to returning to the center position), the process 500 may present the object having the selected values as the joystick moves around. For example, as the user moves the joystick from a first lightness value to a second lightness value, the process 500 may present the object according to an array of different lightness values corresponding to the current location of the joystick. The final-selection value, meanwhile, may correspond to the final location of the joystick prior to returning to the center position.

Figure 6:
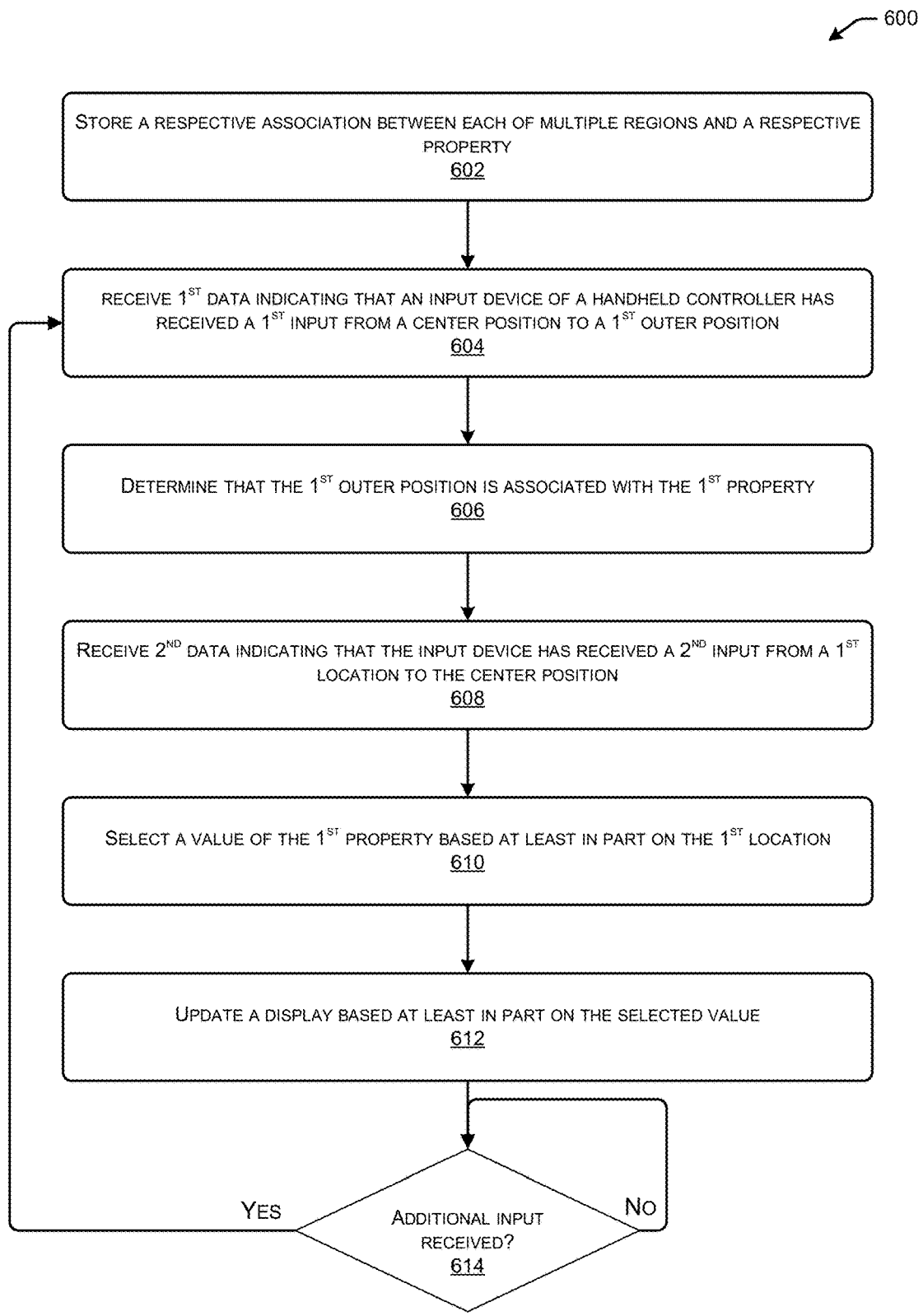
FIG. 6 illustrates a flow diagram of an example process for using an input device on a handheld controller to alter properties of one or more virtual objects presented on a display.

FIG. 6 illustrates a flow diagram of an example process 600 for using an input device on a handheld controller to alter properties of one or more virtual objects presented on a display. The input device may comprise a joystick, a trackpad, a rollerball, or any other type of input device.

An operation 602 represents storing a respective association between each of multiple regions and a respective property. For example, a first region of positions on the input device may be associated with a first property, and so forth. An operation 604 represents receiving first data indicating that an input device of a handheld controller has received a first input, such as an input at a first outer position, an input from a center position to the first outer position, and so forth. This input may comprise a touch input on a trackpad, a movement of a joystick, and the like.

An operation 606 represents determining that the first outer position is associated with a first property, while an operation 608 represents receiving second data indicating that the input device has received a second input, such as an input at a first location, an input from the first location to the center position, and so forth. Again, this may comprise a touch input from a first location to the center location, a joystick moving from the first location to the center position, an input on a trackpad at the first location followed by removal of the input device (e.g., finger, stylus, etc.) from the trackpad, and the like.

An operation 610 represents selecting a value of the first property based at least in part on the first location. This value may comprise a color-related value (e.g., hue, brightness, lightness, value, saturation, shading, etc.), a text-related value (e.g., font size, font type, line spacing, etc.), or a value for any other type of property. An operation 612, meanwhile, represents updating a display based at least in part on the selected value. For instance, an object may be presented according to the color-related value, text may be presented according to the text-related value, or the like. Finally, an operation 614 represents determining whether an additional input has been received. If so, the process 600 may loop back to operation 604 and onwards for again updating a value of a property based on received inputs and updating a display based on the updated value of the property.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
one or more processors; and
one or more computer-readable media storing computer-executable instructions that, when executed, cause the one or more processors to perform operations comprising:
receiving first data indicating that a joystick of a handheld controller has moved from a center position to a first outer position;
determining that the first outer position is within a first range of outer positions associated with a first property;
receiving second data indicating a first location of the joystick within the first range of outer positions;
receiving third data indicating that the joystick has moved from the first location to the center position;
selecting a value of the first property based at least in part on the first location;
receiving fourth data indicating that the joystick has moved from the center position to a second outer position;
determining that the second outer position is within a second range of outer positions associated with a second property;
receiving fifth data indicating a second location of the joystick within the second range of outer positions;
receiving sixth data indicating that the joystick has moved from the second location to the center position; and
selecting a value of the second property based at least in part on the second location.

2. The system as recited in claim 1, wherein:
the first property comprises at least one of a hue, saturation, or lightness of a color; and
the second property comprises at least one other of the hue, saturation, or lightness of the color.

3. The system as recited in claim 1, the operations further comprising:
receiving seventh data indicating that the joystick has moved from the center position to a third outer position;
determining that the third outer position is within a third range of outer positions associated with a third property;
receiving eighth data indicating a third location of the joystick within the third range of outer positions;
receiving ninth data indicating that the joystick has moved from the third location to the center position; and
selecting a value of the third property based at least in part on the third location.

4. The system as recited in claim 3, wherein:
the first property comprises a hue of a color;
the second property comprises a saturation of the color; and
the third property comprises a lightness of the color.

5. The system as recited in claim 4, the operations further comprising presenting, on a display, an object according to the selected value of the hue, the selected value of the saturation, and the selected value of the lightness.

6. The system as recited in claim 4, the operations further comprising:
storing an association between the first range of outer positions and the hue;
storing an association between the second range of outer positions and the saturation; and
storing an association between the third range of outer positions and the lightness.

7. The system as recited in claim 6, wherein the first range of outer positions is approximately equal to the second range of outer positions, and the second range of outer positions is approximately equal to the third range of outer positions.

8. A method comprising:
receiving first data indicating that an input device of a handheld controller has received a first input from a center position to a first outer position;
determining that the first outer position is within a first range of outer positions associated with a first property;
receiving second data indicating that the input device has received a second input from a first location within the first range of outer positions to the center position;
selecting, after returning to the center position, a value of the first property based at least in part on the first location;
receiving third data indicating that the input device has received a third input from the center position to a second outer position;
determining that the second outer position is within a second range of outer positions associated with a second property;
receiving fourth data indicating that the input device has received a fourth input from a second location within the second range of outer positions to the center position; and
selecting, after returning to the center position, a value of the second property based at least in part on the second location.

9. The method as recited in claim 8, wherein the input device comprises a joystick or a trackpad.

10. The method as recited in claim 8, wherein:
the first property comprises at least one of a hue, saturation, or lightness of a color; and
the second property comprises at least one other of the hue, saturation, or lightness of the color.

11. The method as recited in claim 8, further comprising:
receiving fifth data indicating that the input device has received a fifth input from the center position to a third outer position;
determining that the third outer position is within a third range of outer positions associated with a third property;
receiving sixth data indicating that the input device has received a sixth input from a third location within the third range of outer positions to the center position; and
selecting, after returning to the center position, a value of the third property based at least in part on the third location.

12. The method as recited in claim 11, wherein:
the first property comprises a hue of a color;
the second property comprises a saturation of the color; and
the third property comprises a lightness of the color.

13. The method as recited in claim 12, further comprising presenting, on a display, an object according to the selected value of the hue, the selected value of the saturation, and the selected value of the lightness.

14. The method as recited in claim 12, further comprising:
storing an association between the first range of outer positions and the hue;
storing an association between the second range of outer positions and the saturation; and
storing an association between the third range of outer positions and the lightness.

15. The method as recited in claim 14, wherein the first range of outer positions is approximately equal to the second range of outer positions, and the second range of outer positions is approximately equal to the third range of outer positions.

16. A system comprising:
one or more processors; and
one or more computer-readable media storing computer-executable instructions that, when executed, cause the one or more processors to perform operations comprising:
receiving first data indicating that an input device of a handheld controller has received a first input from a center position to a first outer position that is within a first range of outer positions;
determining that the first outer position is associated with a first property;
receiving second data indicating that the input device has received a second input from a first location within the first range of outer positions to the center position; and
selecting a value of the first property based at least in part on the first location.

17. The system as recited in claim 16, wherein the first property comprises at least one of a hue, saturation, or lightness of a color.

18. The system as recited in claim 16, the operations further comprising:
receiving third data indicating that the input device has received a third input from the center position to a second outer position;
determining that the second outer position is associated with a second property;
receiving fourth data indicating that the input device has received a fourth input from a second location to the center position; and
selecting a value of the second property based at least in part on the second location.

19. The system as recited in claim 18, the operations further comprising:
storing an association between the first range of outer positions and the first property; and
storing an association between a second range of outer positions and the second property; and
wherein the first outer position is within the first range of outer positions and the second outer position is within the second range of outer positions.

20. The system as recited in claim 19, wherein the first range of outer positions is approximately equal to the second range of outer positions.

* * * * *